T. J. LOVETT.
PIPE DREDGE.
APPLICATION FILED MAR. 2, 1908.
908,113.
Patented Dec. 29, 1908.
5 SHEETS—SHEET 3.
Fig. 3.
Fig. 4.
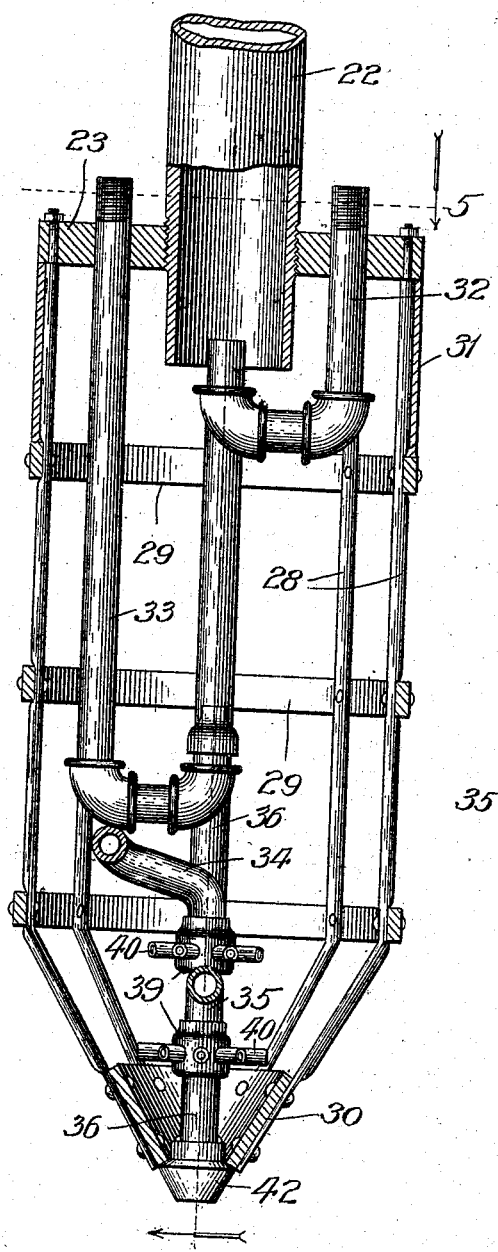
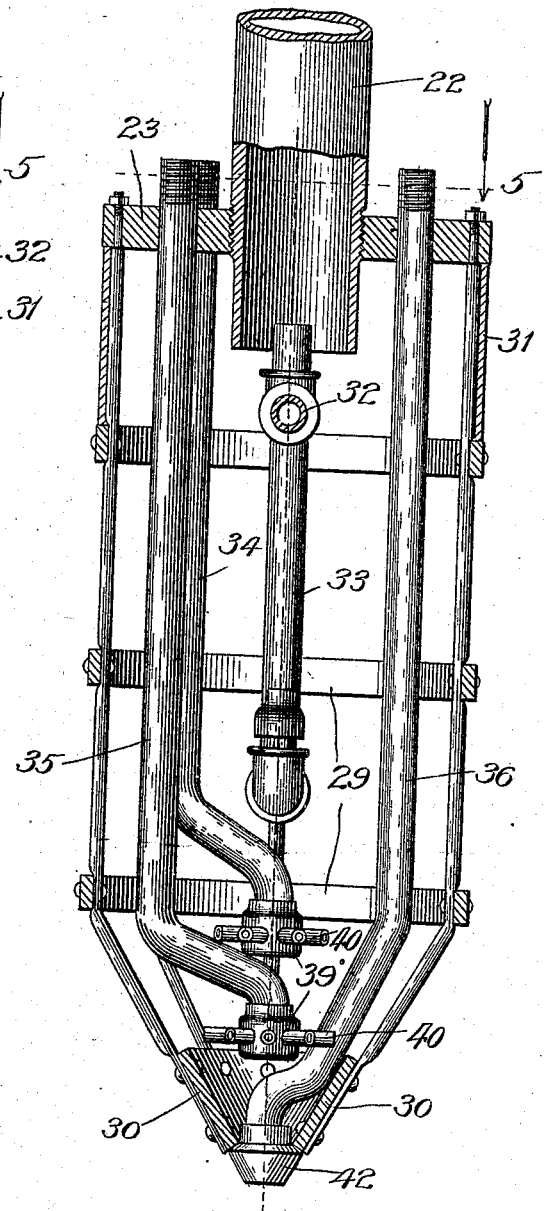
Witnesses:
Inventor:
Thomas J. Lovett.
By Dyrenforth, Lee, Chritton & Wiles,
Atty's.

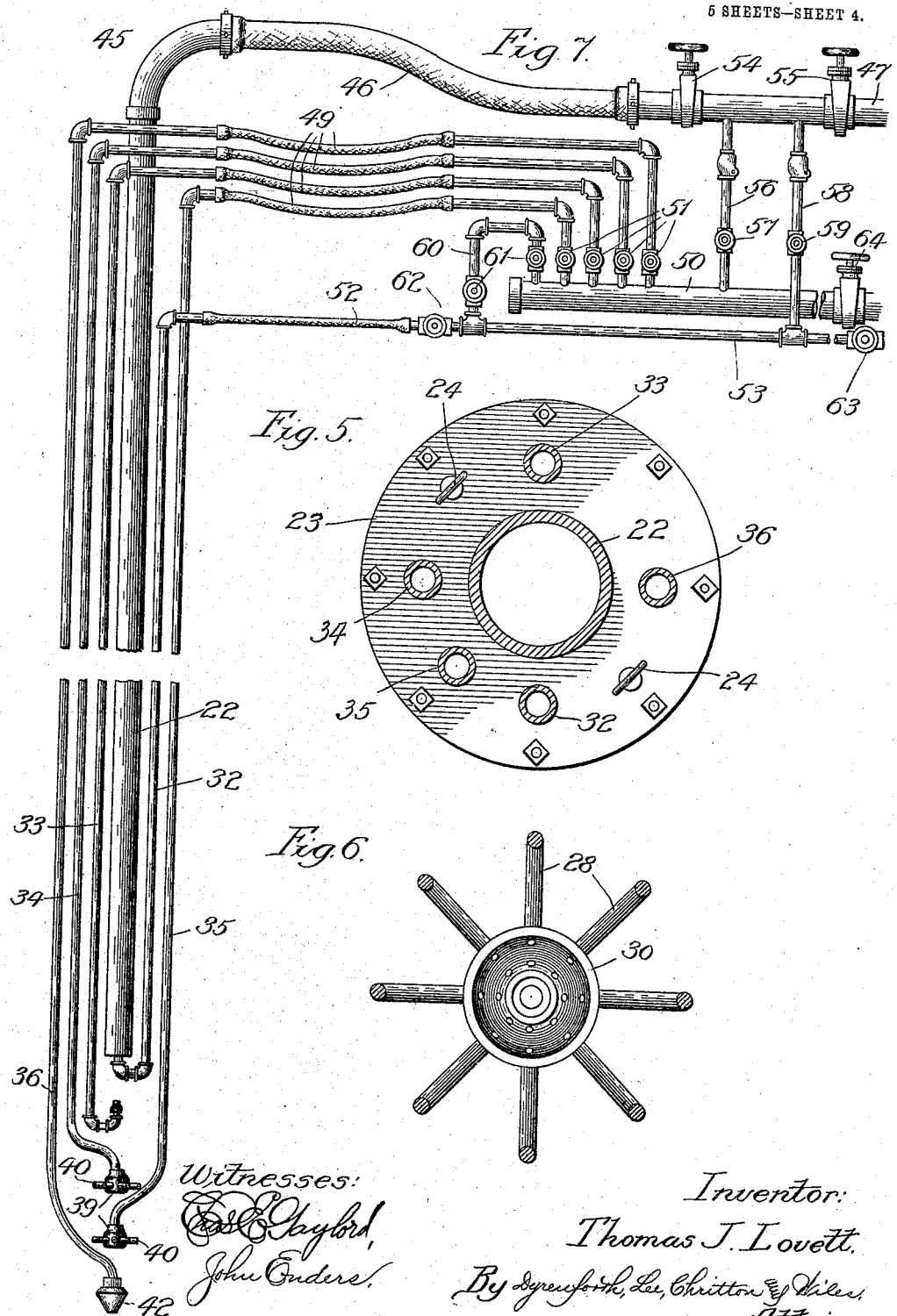

UNITED STATES PATENT OFFICE.

THOMAS J. LOVETT, OF SACRAMENTO, CALIFORNIA, ASSIGNOR TO BLACK SAND & GOLD RECOVERY COMPANY, OF CHICAGO, ILLINOIS, A CORPORATION OF ARIZONA TERRITORY.

PIPE-DREDGE.

No. 908,113.

Specification of Letters Patent.

Patented Dec. 29, 1908.

Application filed March 2, 1908. Serial No. 418,790.

*To all whom it may concern:*

Be it known that I, THOMAS J. LOVETT, a citizen of the United States, residing at Sacramento, in the county of Sacramento and State of California, have invented a new and useful Improvement in Pipe-Dredges, of which the following is a specification.

My invention relates to an improvement in the so-called "pipe dredges" which are of the type wherein a jet of air under pressure, supplemented by water under pressure, is directed into the mouth of a movable and adjustable dredging pipe to gather into and force through the pipe the material to be dredged.

The pipe dredge which has but recently been improved to the stage wherein its practical utility is generally recognized possesses certain distinctive advantages over dredges of the "suction" type or those of the "mechanical" type employing dredging-buckets, particularly for raising and delivering sand, silt, gravel or the like material susceptible of rapid disintegration by the action of water under pressure directed against it. These advantages may be stated briefly to lie in the facts that the pipe dredge involves a less expensive equipment, has greater capacity under the same power application, can excavate from a greater depth, and is adapted to a broader field of operation than dredges of other types hitherto employed.

My object is to provide certain improvements in the construction of a pipe dredge, which improvements I have found necessary, or at least desirable, in practical operations in the field.

Figure 1:
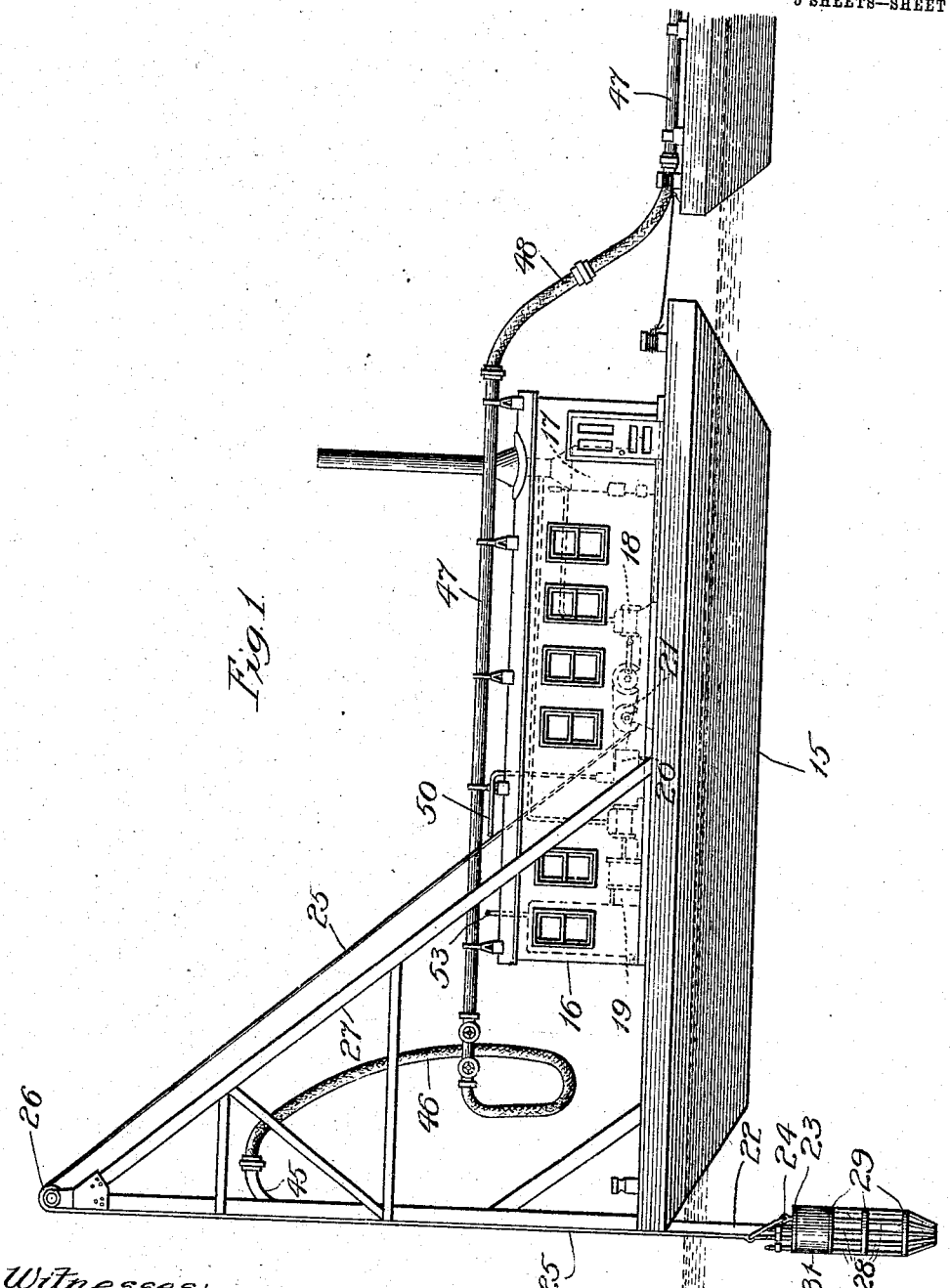
Figure 2:
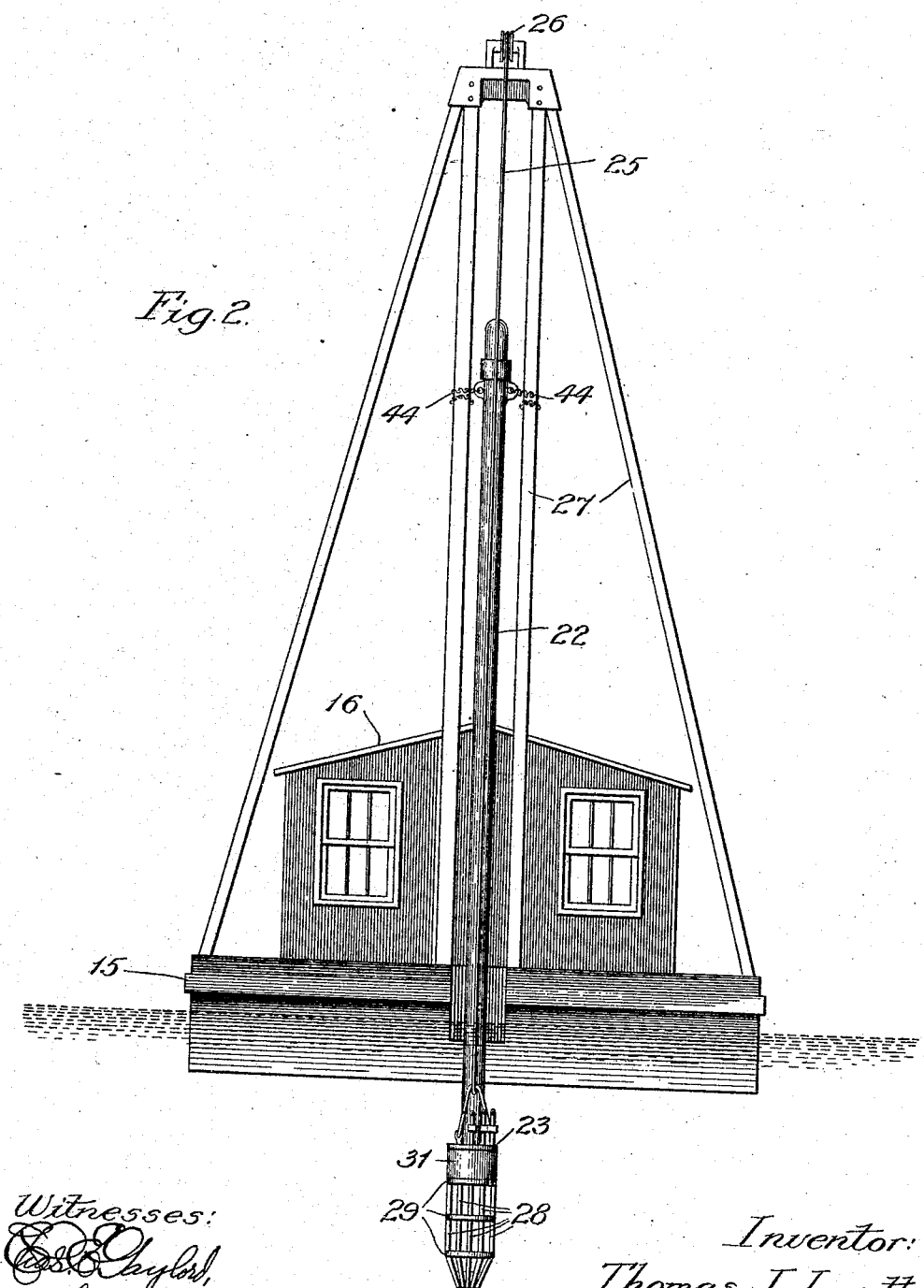
Figure 8:
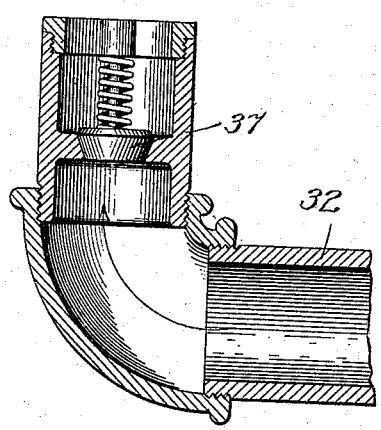
Figure 9:
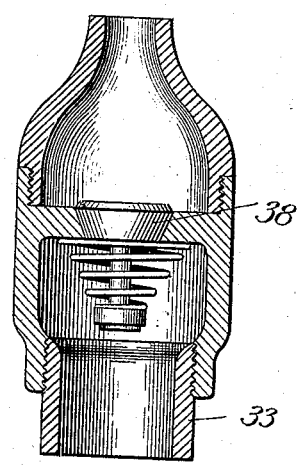
Figure 10:
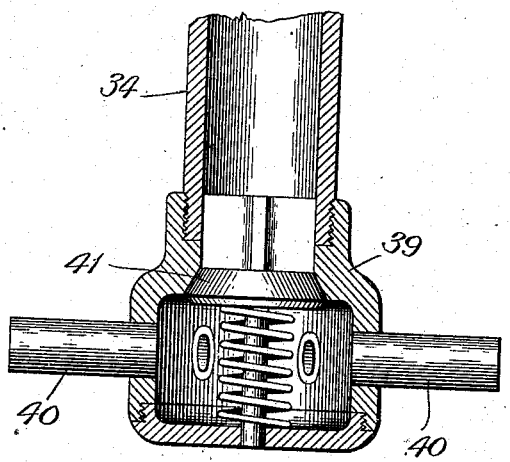
Figure 11:
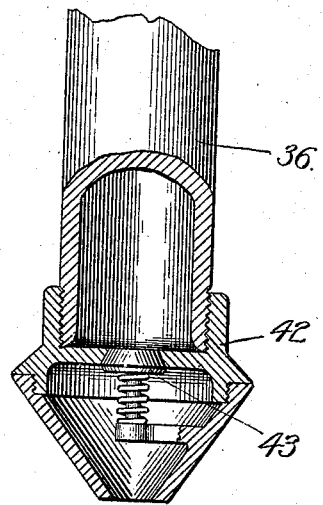

In the accompanying drawings which illustrate my improvements—Figure 1 is a broken view showing a floating dredge in side elevation with a pontoon, the air and water supplying pipes being broken away at the head carried by the main or dredging pipe; Fig. 2, a front elevation of the dredge with the same pipes broken away; Figs. 3 and 4, enlarged broken sectional views of the lower end portion of the dredging pipe and illustrating the head and its equipment; Fig. 5, a plan section taken on line 5 in Figs. 3 and 4; Fig. 6, a sectional plan view of the shoe-portion of the head; Fig. 7, a broken diagrammatic view showing the dredging pipe and air and water supplying pipes with their controlling valves; Fig. 8, an enlarged broken section of the delivery-end portion of the air-jet pipe; Fig. 9, a similar view of the delivery-end portion of the "return water" pipe; Fig. 10, a similar view of the delivery-end portion of a "cutter jet" pipe; and Fig. 11, a similar view of the delivery-end portion of the "pilot jet" pipe.

15 is a floating hull provided with a superstructure 16 housing a boiler 17, engine 18, air-compressor 19, preferably reciprocating water-pump 20, winch 21 and any other necessary power apparatus. All the apparatus may be upon a floating hull or in any other location or locations desired.

22 is the main or dredging pipe provided near its lower end with a surrounding disk or plate 23 provided with eye-bolts 24 or like means for the attachment thereto of a raising and lowering cable 25 passing over a sheave 26 at the top of the derrick-frame 27 to the winch 21.

Rigidly secured to the disk 23 is a cage or grid formed of spaced bars 28 reinforced by rings or collars 29 and tapering at the lower end portion to a frusto-conicals hoe 30. The bars 28 are fastened to the reinforcing collars and shoe by means of rivets, as indicated, and the bars may be either round, as indicated, or of any other desired shape in cross-section. Surrounding the bars 28 between the disk 23 and upper collar 29 is a cylindrical wall 31 forming with the disk a hood reaching below the plane of the mouth of the pipe 22. The disk, cage and attendant parts form an open head for the dredging pipe. Surrounding and paralleling the pipe 22 are an air-supply pipe 32, a water-supplying pipe or "return water" pipe 33, a water pipe, or "upper-cutter" supply pipe, 34, a water pipe, or "lower-cutter" supply pipe, 35, and a water pipe, or "pilot-jet" supply pipe, 36. The pipe 32 at its delivery end projects centrally upward a short distance into the mouth-portion of the dredging-pipe 22 and is provided in its end portion with a suitable check-valve 37. The "return water" pipe 33 has an upward-extending contracted end portion terminating centrally below the delivery end of the pipe 32 and is provided with a suitable check-valve 38. The cutter-pipes 34, 35 terminate in heads 39 containing chambers from which radiate short outlet-pipes or nozzles 40. The heads 39 contain check-valves 41 of suitable construction, and are located one above the other and centrally below the mouth of the pipe 22, beneath the "return water" pipe. The "pilot-jet" pipe 36 terminates in a chambered head 42 which projects through the opening in the shoe 30 and contains a suitable check-valve 43.

The check-valves described operate as "non-return" valves, permitting the ready egress of fluid from the pipes, but preventing the ingress of material at any time which might tend to clog the pipes. Any other form of suitable "non-return" valves may be substituted for those shown. The air and water pipes described pass through openings provided for them in the disk 23 and similar disks, or spiders, may be provided along the pipe 22 at desired intervals to hold all the pipes in rigid relation to each other. The water and air supply pipes described may extend more or less nearly to the top of the dredging-pipe 22 and are raised and lowered with the latter by means of the cable 25, between the forward central uprights of the derrick-frame. The upper end of the pipe-cluster may be steadied by chains 44 fastened to the cluster and passing around the uprights, as indicated, or the steadying may be accomplished by any other suitable means. The dredging-pipe 22 terminates at its upper end in a segmental elbow 45, at which it is connected by means of a flexible hose 46 with the discharge-pipe 47. The discharge-pipe 47 may extend to any desired distance and may consist of sections joined together by sleeves, hose-sections 48, or any other suitable means. Some of the sections may be on pontoons, if necessary, and the pipe-line thus formed caused to terminate in the location where it is desired to deliver the material dredged. The water supply pipes are connected at their upper ends through hose-connections 49 with a main water supply pipe 50 extending from the pump 20. Interposed between said water pipes and main supply pipe are opening and closing valves 51. The air-pipe 32 communicates at its upper end through a flexible hose 52 with an air-supply pipe 53 which extends to the compressor reservoir 19. Interposed in the pipe 47 are preferably two gate-valves 54 and 55, and extending to the pipe 47 between the said gate-valves is a pipe 56, having a valve 57, communicating with the water supply pipe 50, and a pipe 58 having a valve 59 and communicating with the air-supply pipe 53. Extending from the pipe 53 to the pipe 50 is a pipe-connection 60 provided with one or two valves 61. The pipe 53 may be provided with a valve 62 between the pipe 60 and hose 52 and with a valve 63 between the pipe 58 and compressor; and the pipe 50 may be provided with a valve 64 between the pump and pipe 56.

In practice the pipe-cluster may be lowered by means of the winch 21 to the proper depth in the material to be dredged. The lowering of the dredging, and other, pipes may be aided by directing a jet of water from the main water pipe 50 through the "pilot-jet" 42, which by displacing material will permit the pipe-cluster to descend by gravity. If desired, the displacing of material may be further aided by opening the valves which will direct water from the pipe 50 to the upper and lower cutter-jets. If, for example, sand, gravel, or the like, is to be dredged from beneath overlying layers of clay or other material, the pipe can be caused to jet its way through the clay, or the like, and descend either by gravity alone, or with the addition of ramming, to the depth desired. Excepting only for particular purposes hereinafter described, the valves 54, 55 and 64 remain always open and the valves 57, 59 and 61 remain always closed. When the operator starts to lower the pipe or when the head has reached the position or depth at which dredging is to proceed, he opens the valves 62 and 63, if both have been closed, thereafter regulating the force of the jet of air thus turned into the pipe 32 by manipulating one of said valves, say the valve 63. The valves 51 are also manipulated by him to provide a suitable jet of "return-water" through the pipe 33 and suitable "cutting-jets" through one or both heads 39. The "pilot-jet" through pipe 36 may, as a rule, be shut off except when it is desired to further lower the pipe. The "cutter-jets" operate to stir into solution the material to be dredged, which is forced by the "return-water" jet in the direction of the mouth of the main-pipe 22. The main lifting and impelling force is contributed by the air-jet from the pipe 32, which tends to suck the material into the lower end of the pipe and force it upward through the pipe. The gathering of the material into the mouth of the pipe is greatly aided by the "return-water" jet supplemented by the confining action of the housing formed by the cylindrical wall 31 and disk 23. As stated, the height to which the dredged material may be raised and the strength of head under which it is forced through the delivery pipe 47 depends for the most part upon the strength of the air-jet, which by its direct and expanding forces impels the solution. The strength of the air-jet will, of course, depend upon the degree of opening of the valve 63 and the speed of the compressor. This can all be regulated in accordance with the length of the pipe-line 47 and consequently the distance at which the dredged material is to be discharged. Under a given head a solution containing, say, ten per cent. of solids can be driven through the pipe-line a given distance to be discharged at a given elevation. An increased head of pressure, other things being equal, is required to discharge a solution containing an increased percentage of solids, or to discharge the solution at a greater elevation or at a greater distance. All of this would be regulated by the strength and volume of the air-jet, as described, and to some extent by the strength of the "return-water" jet. The percentage of solids in the solution can ordinarily be regulated by the strength and supply of the "cutter-jets" coupled with that of the "return-water" jet, and this can all be regulated by manipulating the valve 51.

In case the pipe-line 47 should become clogged from any cause, the "cutter-jets" may be shut off temporarily, so that the proportion of solids in the solution impelled through the pipe may be reduced. If the degree of clogging requires that no solids for the time being shall be directed into the pipe 47, the valve 54 may be closed and the valves 62 and 51 as well, so that a force of mixed air and water may be directed immediately into the pipe-line 47 to clear it of obstructions. Under certain conditions either the valve 57 or 59 may be opened alone to clean out the pipe-line 47. In stopping operations, particularly in the case of a long pipe-line 47, the valve 54 should be closed and the valves 57, 59 opened to clean out the pipe-line before the solids have a chance to settle therein. After cleaning out the pipe-line the valve 55 may be closed and the valve 54 opened to direct fluid from either or both the pipes 56, 58 down through the pipe 22 to clear the latter and the hose 46, when necessary.

When dredging has been performed especially under a heavy over-burden of clay, it is sometimes difficult, if not impossible, to raise the dredging-pipe by means of a winch alone, owing to the pressure against the pipe-cluster of this over-burden. Under the same conditions it is sometimes difficult to further lower the dredging-pipe and attendant parts. By closing either the valve 54 or 55 the air from the pipe 32 is prevented from passing through the dredging-pipe and pipe-line and will escape from beneath the hood portion of the head and rise around and through the pipe-cluster, with the effect of clearing a path around the pipe-cluster and thus freeing it so that it can be raised by means of the winch. If a greater force or volume of air is required for this purpose, the valves 61 may be opened and the valve 64 closed and air caused to pass through the "return-water" pipe 33 as well as, if desired, through one or all pipes 34, 35 and 36. When the air under pressure is directed into the head portion and a valve to the pipe-line is closed, the pressure of the surrounding water and over-burden causes the air-pressure to accumulate at the head with the full force of the compressor, and as its easiest path of escape is directly upward around and through the pipe-cluster, it invariably has the effect of freeing the latter sufficiently from the clay, or the like, to permit its being raised by the winch without dragging down the forward end of the hull unduly.

The advantages named, and others, found necessary or desirable in the operation of a pipe-dredge are rendered easy of accomplishment by the connections and disposition of valves above described. When any of the water or air supply pipes are thrown out of action for any reason, there is always danger of the inrush of solids which would tend to clog the outlets to the extent of making it difficult or impossible to clean them out with fluid-pressure. By providing the valves described in the outlet-end-portions of the air and water-pipes this undue clogging is prevented.

The head, provided as described, forms a strong and durable construction particularly well adapted for its purpose. The grid formed by the bars and rings prevents access to the chamber of any undisintegrated objects that cannot be discharged through the dredging-pipe, and tends to prevent such objects from obstructing the force of the jets. It also affords a ramming-head or point that will withstand necessary strain.

What I claim as new and desire to secure by Letters Patent is—

1. In a pipe-dredge, the combination with the dredging-pipe, of a head at the lower end of said pipe constructed with vertically-disposed parallel side-bars forming a chamber-incasing grid, and jet-pipes terminating in said chamber.

2. In a pipe-dredge, the combination with the dredging-pipe, of a head at the lower end of said pipe constructed with vertically-disposed parallel side-bars and reinforcing rings forming a chamber-incasing grid, and jet-pipes terminating in said chamber.

3. In a pipe-dredge, the combination with the dredging-pipe, of a head at the lower end of said pipe constructed with bars forming a chamber-incasing grid, a shoe at the lower end of said grid, and jet-pipes terminating in said chamber.

4. In a pipe-dredge, the combination with the dredging-pipe, of a head at the lower end of said pipe, constructed with vertically-disposed parallel side-bars forming a chamber-incasing grid, a tapering shoe secured to the lower end-portions of said bars, and jet-pipes terminating in said chamber.

5. In a pipe-dredge, the combination with the dredging-pipe, of a head at the lower end of said pipe forming a chamber-incasing grid, a plate forming the top of said chamber, and jet-pipes extending through said plate and terminating in said chamber.

6. In a pipe-dredge, the combination with the dredging-pipe, of a head at the lower end of said pipe constructed with side-bars forming a chamber-incasing grid, a plate forming the top of said chamber, a tapering shoe secured to said bars and forming the bottom of said chamber, and jet-pipes extending through said plate and terminating in said chamber.

7. In a pipe-dredge, the combination with the dredging-pipe, of a head at the lower end of said pipe constructed with side-bars forming a chamber-incasing grid, a plate forming the top of said chamber, and a wall extending downward from said plate and inclosing the upper part of said chamber.

8. In a pipe-dredge, the combination with the dredging-pipe, of a head at the lower end of said pipe constructed with side-bars forming a chamber-incasing grid, a plate forming the top of said chamber, a downwardly-tapering shoe provided with a central opening at the bottom of said chamber and jet-pipes terminating in said chamber.

9. In a pipe-dredge, the combination with the dredging-pipe, of a head at the lower end of said pipe constructed with vertically-disposed parallel side-bars forming a chamber-incasing grid, reinforcing rings secured to said bars, a tapering shoe secured to the lower end-portions of said dredging-pipe, and jet-pipes terminating in said chamber.

10. In a pipe-dredge, the combination with the dredging-pipe, of a head at the lower end of said pipe forming a chamber-incasing grid, jet-pipes extending parallel with the dredging-pipe and terminating in said chamber, and a raising and lowering cable for the head and pipes fastened to said head.

11. In a pipe-dredge, the combination with the dredging-pipe, of a head at the lower end of said pipe constructed with bars forming a chamber-incased grid, a perforated tapering shoe secured to the lower end-portion of said bars, jet-pipes terminating in said chamber and a "pilot-jet" pipe extending through said chamber and having a head portion fitting through said perforation.

12. In a pipe-dredge, the combination with the dredging pipe, of a head at the lower end of said pipe constructed with a chamber-incasing grid, an air-jet pipe extending from a compressed-air supplier into said chamber and terminating centrally in the lower end-portion of the dredging-pipe, and a return-water jet-pipe terminating in said chamber below said air-jet pipe.

13. In a pipe-dredge, the combination with the dredging-pipe, of a head at the lower end of said pipe constructed with a chamber-incasing grid, an air-jet pipe extending from a compressed-air supplier and terminating in the lower end of the dredging-pipe; and laterally-discharging cutter-jet pipe terminating in said chamber and surrounded by the grid.

14. In a pipe-dredge, the combination with the dredging-pipe, of a head at the lower end of said pipe constructed with a chamber-incasing grid, an air-jet pipe, extending from a compressed-air supplier and terminating in the lower end of the dredging-pipe a return-water jet-pipe and laterally-discharging cutter-jet pipe both terminating in said chamber below said air-jet pipe.

15. In a pipe-dredge, the combination with the dredging-pipe, of a head constructed with a chamber-incasing grid, an air-jet pipe extending from a compressed-air supplier and terminating in the lower end-portion of said dredging-pipe, return-water jet and cutter-jet pipes terminating in said chamber, below said air-jet pipe and a pilot-jet pipe discharging through the lower end of said chamber.

16. In a pipe-dredge, the combination with the dredging-pipe, of a head at the lower end of said pipe forming a chamber-incasing grid, an air-jet pipe terminating in said chamber and a check-valve in the discharge-end portion of said air-jet pipe.

17. In a pipe-dredge, the combination with the dredging-pipe, of a head at the lower end of said pipe forming a chamber-incasing grid, a return-water pipe terminating in said chamber, and a check-valve in the discharge-end portion of said return-water pipe.

18. In a pipe-dredge, the combination with the dredging-pipe, of a head at the lower end of said pipe forming a chamber-incasing grid, a laterally-discharging cutter-jet pipe terminating in said chamber and a check-valve in the discharge-end portion of said cutter-jet pipe.

19. In a pipe-dredge, the combination with the dredging-pipe, of a head at the lower end of said pipe forming a chamber-incasing grid, a pilot-jet pipe discharging in a downward direction from the bottom of said head, and a check-valve in the discharge-end portion of said pilot-jet pipe.

20. In a pipe-dredge, the combination with the dredging-pipe, pipe line and air-jet supply pipe terminating at the lower end of said dredging-pipe, of a valve interposed between the dredging-pipe and pipe-line constructed to operate substantially as set forth.

21. In a pipe-dredge, the combination with the dredging-pipe, pipe-line and air-jet supply pipe terminating at the lower end of said dredging-pipe, of means for directing fluid under pressure immediately into said pipe-line without passing it through the dredging-pipe to clean the pipe-line in the manner set forth.

22. In a pipe-dredge, the combination with the dredging-pipe, pipe-line and air-jet supply pipe terminating at the lower end of said dredging-pipe, of means for directing water and air under pressure immediately into said pipe-line to clean the pipe-line without passing it through the dredging-pipe in the manner set forth.

23. In a pipe-dredge, the combination with the dredging-pipe, pipe-line and air-jet supply pipe terminating at the lower end portion of said dredging-pipe, of means for directing fluid under pressure into the upper end of said dredging-pipe.

24. In a pipe-dredge, the combination with the dredging-pipe, air-jet and return-water jet pipes, of valves operative to direct air under pressure in place of water into the said return-water jet-pipe, for the purpose set forth.

25. In a pipe-dredge, the combination with the dredging-pipe, air-jet and water-jet pipes, of valves operative to direct air under pressure in place of water into one or more of said water-jet pipes for the purpose set forth.

THOMAS J. LOVETT.

In the presence of—
O. Z. GOSTICK,
M. A. NURSE.